Patented Sept. 26, 1933

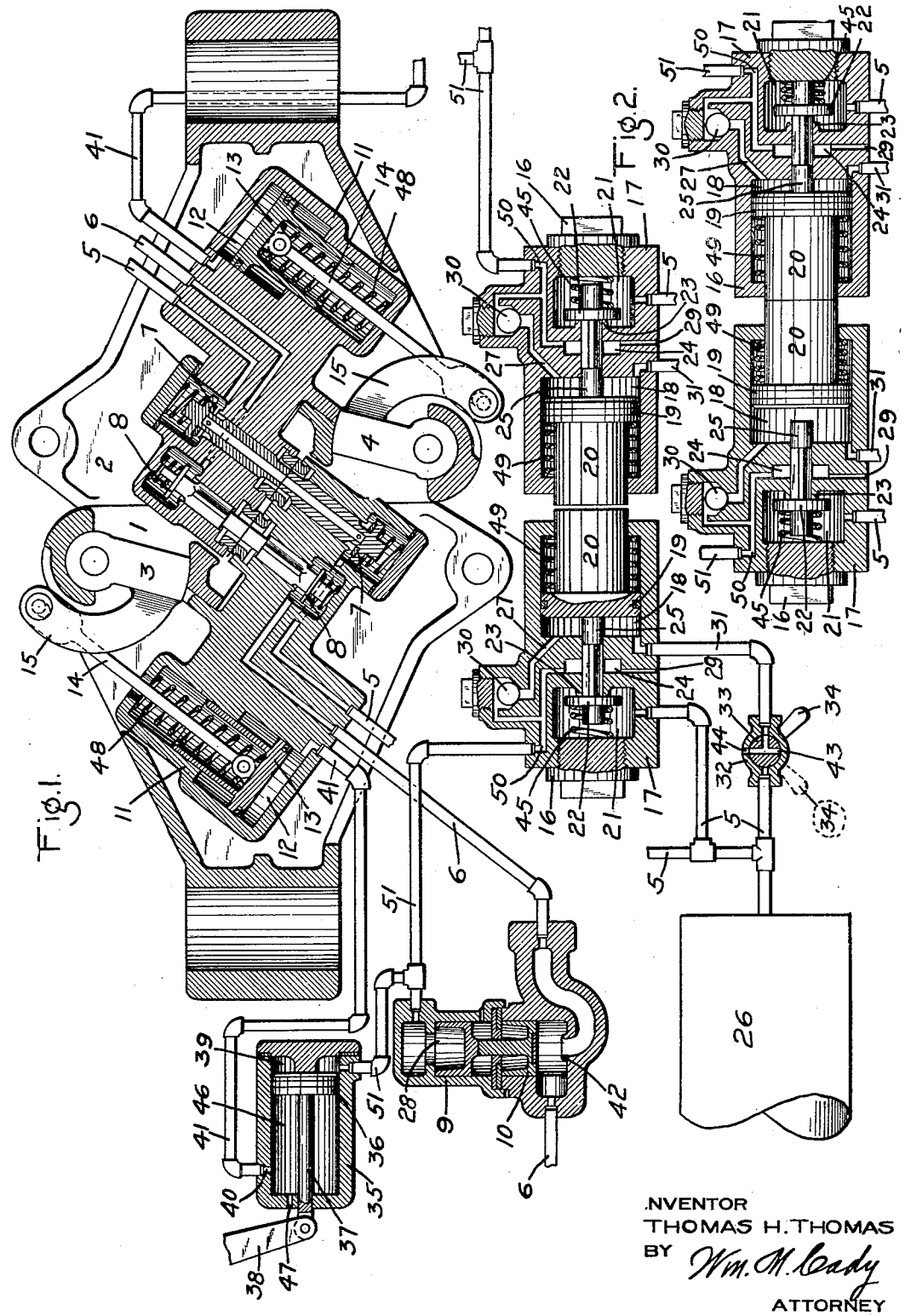

1,927,964

UNITED STATES PATENT OFFICE 1,927,964

COUPLER OPERATING VALVE

Thomas H. Thomas, Edgewood, Pa., assignor to The Westinghouse Air Brake Company, Wilmerding, Pa., a corporation of Pennsylvania Application February 4, 1928. Serial No. 251,866

16 Claims. (Cl. 213—76)

This invention relates to automatic car couplers and particularly to the type having means for tightly locking the couplers in coupled position and known as the tight lock coupler.

One object of my invention is to provide improved means associated with a coupler of the above type whereby the locking means of two coupled couplers may be released when the operator releases the locking means on one car.

Other objects and advantages will appear from the following more detailed description.

In the accompanying drawing; Fig. 1 is a diagrammatic view, partly in section, of two couplers in coupled positions, both embodying the invention; and Fig. 2 is a diagrammatic sectional view of the controlling mechanism of two couplers, the parts of said mechanisms being in positions to release the coupler locking cams.

In the accompanying drawing the reference characters 1 and 2 indicate counterpart car couplers which are adapted to automatically couple upon their coming together, and are adapted to be automatically locked in their coupled positions by locking cams 3 and 4, pivotally mounted on the respective couplers, the cam 3 engaging the coupler 2 and the cam 4 engaging the coupler 1.

These couplers, besides coupling two adjacent cars together, also serve to couple the pipes of the fluid pressure brake system of the cars, such as the main reservoir pipe 5 and brake pipe 6, and if desired other pipes may also be connected. The conduit through each of the couplers, for the main reservoir pipe 5, is controlled by a tappet valve 7, and the conduit for the brake pipe 6 is controlled by a tappet valve 8.

Interposed in the brake pipe 6 of each car, is a brake pipe closing valve device 9, having a piston valve 10, contained within the casing thereof adapted to be automatically operated to shut off the supply of fluid under pressure from the brake pipe to the face of the coupler and will prevent the loss of air from the brake pipe when two coupled couplers are being uncoupled.

Associated with each of the couplers 1 and 2, is a coupler lock operating mechanism which may comprise a casing 11 having a chamber 12 containing a piston 13 having a stem 14 which projects through a wall of the casing 11 and at its outer end is operatively connected with an arm 15 of the adjacent coupler locking cam. The casing 11 may be an integral part of the coupler or may be a separate part, which may be secured to the coupler in any desired manner.

For the purpose of controlling the operation of the coupler lock operating mechanisms of the couplers of adjacent cars, controlling devices 16 are provided, each of which may be carried by one of the couplers or may be made a part thereof. Each controlling device 16 may comprise a casing 17 having a chamber 18 containing a piston 19, having a plunger portion 20, which extends forwardly through and beyond the forward end of the casing.

Contained in a chamber 21 is a valve 22 which is adapted to be normally seated on a seat ring 23 to close communication of this chamber with a chamber 24 formed in the casing 17. This valve has a stem 25 which extends through the chamber 24 and terminates within the piston chamber 18, where it is adapted to be operatively engaged by the piston 19. A portion of this stem is fluted for the purpose of permitting the flow of fluid under pressure from the valve chamber 21 to the chamber 24 when the valve 22 is unseated, said chamber 21 being, at all times, supplied with fluid under pressure from a reservoir 26 by way of the pipe 5.

The piston chamber 18 of the controlling device 16 is connected to a piston chamber 28 of the brake pipe closing valve device 9, by passages 27 and 50 and pipe 51. The passage 50 leads to the chamber 24, which is vented to the atmosphere through a restricted passage 29. Between the passages 27 and 50 there is a ball check valve 30 which prevents the flow of fluid under pressure from the passage 50 to the passage 27. The chamber 18 is connected, by a pipe 31, with a hand operated cock device 32, which is in turn connected with the pipe 5 from the reservoir 26, said cock device comprising a casing in which there is rotatably mounted, a plug valve 33, which is manually operable through the medium of a handle 34.

In the present embodiment of the invention, I have shown a piston device 35, which is adapted to operate an electric train line coupler (not shown). As the electric train line coupler and the mechanism for operating it may be of the same general character as that fully described and shown in United States Letters Patent No. 1,571,222 to Harry F. Woernley, granted February 2, 1926, and as this electric coupler mechanism, as a whole, does not enter into the present invention, a detailed description thereof has been omitted.

The piston device 35 comprises a cylinder containing a piston 36 having a stem 37 extending through one end of the casing and connected at its outer end with a lever 38 for operating the contact carrier of the electric train line coupler. The chamber 39 at one side of the piston 36 is connected with the pipe 51 and upon a predetermined forward movement of the piston, a port 40 will be uncovered, so that fluid under pressure may flow from the chamber 39 to the piston chamber 12 of the coupler lock operating mechanism, associated with the coupler 1, by way of port 40 and pipe 41.

Assuming the couplers at the adjacent ends of two cars to be equipped with my invention, and coupled as shown in Fig. 1 of the drawing, the tappet valves 7 and 8 will be open, having been unseated by the engagement of the tappets upon the coming together of the couplers, so that, communication is established through the main reservoir pipe 5 and brake pipe 6. When the cars are thus coupled, the chambers 39 of the piston devices 35 of the electric train line couplers, and piston chambers 28 of the brake pipe closing valve devices 9 are vented to the atmosphere through pipes 51, passages 50, chambers 24 and atmospheric passages 29. The piston chambers 18 of the controlling devices 16 may be vented to the atmosphere through passages 27 past the ball check valve 30 and through passages 50, chambers 24, and atmospheric passages 29. As the piston chambers 28 of the brake pipe closing valve devices 9 are vented, fluid at brake pipe pressure will maintain the valves 10 of the devices 9 unseated from the seat rings 42.

Further when the cars are thus coupled and the couplers locked, the handles 34 of the cock devices 32 are in the positions as illustrated in full lines in Fig. 1 of the drawing in connection with the cock device shown, in which positions the piston chamber 18 of the control devices 16 are further vented to the atmosphere through pipes 31, passages 43 in the valves 33, and atmospheric ports 44 in the casings of the cock devices 32. The pistons 19 will be in their normal positions, as shown in Fig. 1, and the valves 22 will be maintained seated on the seat rings 23 by the pressure of springs 45. The pistons 36 of the piston devices 35 are in their normal positions, as shown in Fig. 1, and the piston chambers 12 of the coupler lock operating mechanisms are vented to the atmosphere by way of pipes 41, port 40, chambers 46, and atmospheric passages 47, so that the pressure of the springs 48 acting on one side of the pistons 13, tends to maintain the locking cams 3 and 4 in locking engagement with the couplers.

When it is desired to uncouple the couplers 1 and 2, an operator moves the handle 34 of the valve device 32, on one car, to the position as shown by dotted lines in Fig. 1 of the drawing, causing the plug valve 33 to rotate, closing the atmospheric port 44 and establishing communication through the valve device, so that fluid under pressure from the reservoir 26 will flow to the piston chamber 18, of the controlling device 16, on the same car, through pipe 5, passage 43 in the plug valve 33, and pipe 31. From the piston chamber 18 of this controlling device 16, fluid under pressure flows to the piston chamber 28 of the brake pipe closing valve device, and also to the piston chamber 39 of the piston device 35 of the electric train line coupler associated with the coupler 1, through passage 27, past the ball check 30 and through passage 50 and pipe 51. The pressure of fluid in the brake pipe is less than that in the main reservoir 26, since fluid under pressure is supplied to the brake pipe from the main reservoir through the usual feed valve device (not shown). When the pressure of fluid in the chamber 28, as supplied from the main reservoir 26, acting upon a piston contained in this chamber and connected with the piston valve 10 becomes sufficient to overcome the pressure of fluid in the brake pipe 6, acting upon the face of the piston valve 10, said piston valve 10 will be seated on the seat ring 42, thus cutting off further supply of fluid under pressure to the face of coupler 1. The pressure of fluid supplied to the chamber 39 of the piston device 35, causes the piston 36 and stem 37 to move forward to operate the lever 38, which in turn retracts the contact carrier of the electric train line coupler associated with the coupler 1, in the manner described in the hereinbefore mentioned issued patent. When the piston 36 has thus been moved a predetermined distance, it uncovers the port 40 in the casing, so that fluid under pressure flows through pipe 41 to the piston chamber 12 of the coupler lock operating mechanism associated with the coupler 1, and causes the piston 13 and stem 14 to move forward against the pressure of the spring 48 a sufficient distance to rotate the locking cam 3, of the coupler 1, out of locking engagement with the coupler 2.

The pressure of the fluid supplied, as just described, to the piston chamber 18 of the controlling device 16, causes the piston 19 and its plunger 20 to move forward and engage the plunger 20 of the adjacent controlling device 16, and move its plunger and piston 19 rearwardly, said plunger moving the adjacent valve stem 25 in the same direction, unseating the valve 22. Fluid under pressure, supplied to the chamber 21 from a reservoir (not shown) but which may be identical with the reservoir 26, through pipe 5, flows past the open valve 22 into the chamber 24 and from thence through passages 27 and 50 and pipe 51 to the brake pipe closing valve device and piston device of the electric train line coupler, neither of which has been shown but which are identical with those shown on the adjacent car, operating the brake pipe closing valve device to close off the supply of fluid under pressure from the brake pipe 6 to the face of the coupler 2 and operating the piston device to retract the contact carrier of the electric train line coupler associated with the coupler 2, the operation of these parts being hereinbefore fully described in connection with the adjacent car. When the piston device is operated, fluid under pressure is supplied therefrom to the piston chamber 12, causing the piston 13 and piston stem 14 of the coupler lock operating mechanism associated with the coupler 2, to move forward against the pressure of the spring 48 to rotate the locking cam 4 out of locking engagement with the coupler 1. It will be understood that the locking cams 3 and 4 are operated substantially simultaneously.

When the couplers 1 and 2 are separated, the tappet valves 7 and 8 of both couplers will seat, closing off the pipes 5 and 6 to the faces of the couplers.

As the couplers are being separated the pressure of the extended plunger 20, on the plunger 20 of the adjacent controlling device 16, will be relieved, so that the pressure of the spring 45 of this adjacent controlling device, acting on the valve 22, causes the valve to seat on the seat ring 23 and the plunger 20 to move to its normal position of rest, as shown in Fig. 1 of the drawing. The seating of the valve 22 closes off the supply of fluid under pressure from the reservoir 26 to the coupler lock operating mechanism associated with the coupler 2, the piston device 35, and the brake pipe closing valve device 9, so that fluid under pressure in the chambers 12, 39 and 28 respectively of these parts will be vented to the atmosphere by way of pipe 51, passages 27 and 50, chamber 24 and atmospheric passage 29. Pressure of the spring 48 now moves the piston 13 of the coupler lock operating mechanism to its normal position of rest and causes the locking cam 4 to be moved to its proper position to automatically engage the coupler 1, when the couplers are again brought together for coupling. When the chamber 39 is vented, the piston 36 of the piston device 35 will be returned to its normal position, as shown in Fig. 1 of the drawing, and when the chamber 28 of the brake pipe closing valve device is vented, pressure of fluid in the brake pipe 6 will cause the valve 10 to be unseated so that fluid under pressure will flow to the coupler 2, but due to the tappet valve 8 being closed, there will be no escape of fluid under pressure at the face of the coupler.

Before the locking cam 3, associated with the coupler 1, can be again returned to its normal position, the trainman must move the handle 34 of the cock device from the position shown in dotted lines in Fig. 1, to the position shown in full lines, thus operating the plug valve 33, so that the supply of fluid under pressure from the reservoir 26 will be shut off and the fluid under pressure in the piston chamber 18 of the controlling device 16 will be vented to the atmosphere by way of pipe 31, passage 43 in the plug valve 33 and through the atmospheric port 44 in the casing of the cock device. The venting of fluid under pressure from the piston chamber 12 of the coupler lock operating mechanism, chamber 39 of the piston device 35, and chamber 28 of the brake pipe closing valve device 9 is accomplished in the same manner as has before been described in connection with the adjacent car, which results in the locking cam 3 associated with the coupler 1 being returned to its normal position for automatically locking with the coupler 2 when the couplers are again brought together. When fluid under pressure in the chamber 18 is thus vented to the atmosphere, the pressure of a spring 49 acting on the piston will cause said piston and its plunger 20 to be returned to its normal position, as shown in Fig. 1 of the drawing.

In some cases, it may be desired to apply my invention to couplers which do not have electric portions, and in such cases, the piston devices 35 are omitted and the pipes 41 are connected directly to the pipes 51. When this is done, the several parts and devices of the invention will operate in substantially the same manner as described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with two coupled couplers for the ends of two cars, of movable locks for said couplers, piston devices for operating said locks, valve means operable on one of said cars for directly controlling the supply of fluid under pressure to the piston device on said car, piston means on said car subject to the pressure of fluid supplied to said piston device, and valve means on the adjacent car operated by said piston means for controlling the supply of fluid under pressure to the piston device on said adjacent car.

2. The combination with two coupled couplers for the adjacent ends of two cars, of locks for said couplers, piston devices for operating said locks to their release positions, a separate fluid pressure supply source for each one of said piston devices, a valve device on one of said cars operative to supply fluid under pressure from the the fluid pressure supply source on the last mentioned car to the piston device on the same car for operating said piston device to release position, and means subject to the pressure of fluid supplied to said piston device for supplying fluid under pressure from the fluid pressure supply source on the other of said cars to the piston device on the same car for operating said piston device to release position.

3. The combination with two coupled couplers for the adjacent ends of two cars, of locks for said couplers, piston devices for operating said locks to their release positions, a separate fluid pressure supply source for each one of said piston devices, a valve device on each one of said cars, one of which is operative to supply fluid under pressure from the source of supply on the car carrying the valve device which is operated to the piston device on the same car to operate said piston device to release position, and means subject to the pressure of fluid supplied to said piston device for supplying fluid under pressure from the fluid pressure supply source on the other of said cars to the piston device on the same car to operate said piston device to release position.

4. The combination with two coupled couplers for the adjacent ends of two cars, each of said couplers having a brake pipe passage therethrough open to the coupling face of the coupler and registering with the corresponding passage of the other coupler, of a brake pipe connected to each coupler and being open to the brake pipe passage in the coupler to which it is connected, the brake pipes and brake pipe passages being normally charged with fluid under pressure, a fluid pressure supply source on each car, a valve device interposed in each of said brake pipes and operable by fluid under pressure to close off the flow of fluid from the respective brake pipe to the face of the respective coupler for a predetermined period of time, valve means operable on one of said cars to establish communication through which fluid under pressure flows from the fluid pressure supply source on said car to the valve device on the same car, a plunger on said car movable by fluid under pressure flowing to the valve device on said car, and valve means on the adjacent car operated by said plunger for establishing communication through which fluid under pressure flows from the fluid pressure supply source on said adjacent car to the valve device on the same car.

5. The combination with two coupled couplers for the adjacent ends of two cars, of movable locks for said couplers, piston devices operable by fluid under pressure for moving said locks to their release positions, fluid conductors through which fluid under pressure is adapted to be supplied to said piston devices, a cock device operable manually on one of said cars for admitting fluid under pressure to the fluid conductor on the same car and consequently to the piston device on the same car, a valve on the other of said cars operable to admit fluid under pressure to the fluid conductor on said other car and consequently to the piston device on said other car, a plunger for actuating said valve, and a plunger on the first mentioned car operable by fluid under pressure admitted to the fluid conductor on the first mentioned car to engage and actuate the plunger on said other car.

6. The combination with two coupled couplers for the adjacent ends of two cars, of locks for said couplers, piston devices operable by fluid under pressure for moving said locks to their release positions, fluid conductors through which fluid under pressure is adapted to be supplied to said piston devices, a normally closed cock device on each of said cars operable to admit fluid under pressure to one of said fluid conductors and consequently to one of said piston devices, and interengaging counterpart valve mechanisms carried by said cars operated by fluid under pressure supplied to the fluid conductor on one car for admitting fluid under pressure to the fluid conductor on the adjacent car and consequently to the piston device on said adjacent car.

7. The combination with two coupled couplers for the adjacent ends of two cars, of movable locks for said couplers, piston means operable by fluid under pressure for moving said locks to their release positions, fluid conductors through which fluid under pressure is adapted to be supplied to said piston devices, normally closed cock devices on said cars, each of said cock devices being operable manually to admit fluid under pressure to one of said fluid conductors and consequently to one of said piston devices, normally closed valves on said cars, each of said valves being operable to admit fluid under pressure to one of said fluid conductors and consequently to one of said piston devices, and plungers on said cars for operating said valves, the plunger on one of said cars being operated by fluid under pressure admitted to the fluid conductor on the same car upon the opening of the cock device on the same car to engage and operate the plunger on the adjacent car to open the valve on said adjacent car.

8. The combination with two coupled couplers for the adjacent ends of two cars, of movable locks for said couplers, piston devices operable by fluid under pressure for moving said locks to their release positions, fluid conductors through which fluid under pressure is adapted to be supplied to said piston devices, valve devices normally closing off the flow of fluid through said conductors, each of said valve devices being manually operable to admit fluid under pressure to one of said conductors and consequently to one of said piston devices, valves on said cars normally closed and each being operable to admit fluid under pressure to one of said conductors, and inter-engaging pressure sensitive means carried by both of said cars responsive to fluid under pressure supplied to the fluid conductor on one car for actuating the valve on the other car to admit fluid under pressure to the fluid conductor and consequently to the piston device on said other car.

9. The combination with two coupled couplers, of movable locks for said couplers, piston devices for operating said locks to their release positions, fluid conductors through which fluid under pressure is adapted to be supplied to said piston devices, cock devices operable manually to admit fluid under pressure to said fluid conductors and consequently to said piston devices, counterpart controlling devices on said cars comprising valves operable to admit fluid under pressure to said fluid conductors and consequently to said piston devices and also comprising aligned plungers for actuating said valves, one of said plungers being responsive to the pressure of fluid admitted to one of said fluid conductors when one of said cock devices is operated, for engaging and operating the other of said plungers and thereby the corresponding valve to admit fluid under pressure to the other of said fluid conductors and consequently to the other of said piston devices.

10. The combination with two coupled couplers for the adjacent ends of two cars, of locks locking said couplers together, piston devices operable by fluid under pressure for moving said locks to their release positions, counterpart plunger devices on said cars, each of said plunger devices comprising a casing having a pressure chamber which is connected through a conduit to one of said piston devices and having a valve chamber normally charged with fluid under pressure, a plunger, and a normally seated supply valve in said valve chamber operable by said plunger to admit fluid under pressure from said valve chamber to said conduit, a pipe connection through which fluid under pressure is adapted to be supplied to said pressure chamber, a normally closed valve interposed in said pipe connection operable to supply fluid under pressure through said pipe connection to said pressure chamber and consequently to the piston device for effecting the operation of said piston device to move one of said locks to release position, the plunger on one car being responsive to fluid under pressure supplied to said pressure chamber for engaging and operating the plunger of the plunger device on the adjacent car to unseat the supply valve on said adjacent car to admit fluid under pressure to the piston device on said adjacent car to effect the operation of the piston device to move the coupler lock on said adjacent car to release position.

11. The combination with two coupled couplers for the adjacent ends of two cars, of locks locking said couplers together, piston devices operable by fluid under pressure for moving said locks to their release positions, counterpart plunger devices on said cars, each of said plunger devices comprising a casing having a pressure chamber which is connected through a conduit to one of said piston devices and having a valve chamber normally charged with fluid under pressure, a plunger, and a normally seated supply valve in said valve chamber operable by said plunger to admit fluid under pressure from said valve chamber to said conduit, a pipe connection through which fluid under pressure is adapted to be supplied to said pressure chamber, a normally closed valve interposed in said pipe connection operable to supply fluid under pressure through said pipe connection to said pressure chamber and consequently to the piston device for effecting the operation of said piston device to move one of said locks to release position, the plunger on one car being responsive to fluid under pressure supplied to said pressure chamber for engaging and operating the plunger of the plunger device on the adjacent car to unseat the supply valve on said adjacent car to admit fluid under pressure to the piston device on said adjacent car to effect the operation of the piston device to move the coupler lock on said adjacent car to release position, and a check valve on said adjacent car preventing fluid, being supplied to the piston device on said adjacent car, from flowing to the pressure chamber of the plunger device on said adjacent car.

12. The combination with two coupled couplers for the adjacent ends of two cars, said couplers having registering brake pipe passages therethrough and valves operative to close said passages to the faces of said couplers when the couplers are separated, of a brake pipe on each car opening into the brake pipe passage in the respective coupler, locks for said couplers, piston devices operable by fluid under pressure for moving said locks to their release positions, fluid conductors through which fluid under pressure is adapted to be supplied to said piston devices, a normally closed cock device on each of said cars operable to admit fluid under pressure to one of said fluid conductors and consequently to one of said piston devices, means responsive to the pressure of fluid supplied to said fluid conductors for admitting fluid under pressure to the fluid conductor and consequently to the piston device on the adjacent car, and means on each one of the cars in communication with the fluid conductor on the respective car and responsive to the pressure of fluid supplied through the respective fluid conductor to said piston device for closing off the flow of fluid under pressure from the respective brake pipe to the connected brake pipe passage, whereby the operation of said means is interlocked with the operation of said piston device.

13. The combination with two coupled couplers for the adjacent ends of two cars, said couplers having registering brake pipe passages therethrough and valves operative to close said passages to the faces of said couplers when the couplers are separated, of a brake pipe on each car opening into the brake pipe passage in the respective coupler, locks for said couplers, piston devices operable by fluid under pressure for moving said locks to their release positions, fluid conductors through which fluid under pressure is adapted to be supplied to said piston devices, a normally closed cock device on each of said cars operable to admit fluid under pressure to one of said fluid conductors and consequently to one of said piston devices, means responsive to the pressure of fluid supplied to said fluid conductor for admitting fluid under pressure to the fluid conductor and consequently to the piston device on the adjacent car, means on each one of the cars in communication with the fluid conductor on the respective car and responsive to the pressure of fluid supplied through the respective fluid conductor to said piston device for closing off the flow of fluid under pressure from the respective brake pipe to the connected brake pipe passage, whereby the operation of said means is interlocked with the operation of said piston device, means for venting fluid under pressure from said fluid conductors at a predetermined slow rate, means for returning said piston devices to their normal positions upon a predetermined reduction in pressure in said conductors, and means for returning the second mentioned means to their normal positions upon the reduction in pressure in said conductors.

14. The combination with two coupled couplers for the adjacent ends of two cars, said couplers having registering brake pipe passages therethrough and valves operative to close said passages to the faces of said couplers when the couplers are separated, of a brake pipe on each car opening into the brake pipe passage in the respective coupler, locks for said couplers, piston devices operable by fluid under pressure for moving said locks to their release positions, fluid conductors through which fluid under pressure is adapted to be supplied to said piston devices, a normally closed cock device on each of said cars operable to admit fluid under pressure to one of said fluid conductors and consequently to one of said piston devices, means responsive to the pressure of fluid supplied to said fluid conductor for admitting fluid under pressure to the fluid conductors and consequently to the piston device on the adjacent car, and valve devices for controlling communications from the brake pipes to said brake pipe passages, each one of said valve devices comprising a casing having a piston chamber in communication with the respective fluid conductor and piston device, a valve normally establishing communication from one brake pipe to the respective brake pipe passage, and a piston in said chamber responsive to the pressure of fluid supplied, through said fluid conductor to said piston device, to said chamber for seating said valve to close the communication from the brake pipe to the connected brake pipe passage, whereby the operation of said means is interlocked with the operation of said piston device.

15. The combination with two coupled couplers for the adjacent ends of two cars, said couplers having registering brake pipe passages therethrough and valves operative to close said passages to the faces of said couplers when the couplers are separated, of a brake pipe on each car opening into the brake pipe passage in the respective coupler, locks for said couplers, piston devices operable by fluid under pressure for moving said locks to their release positions, fluid conductors through which fluid under pressure is adapted to be supplied to said piston devices, a normally closed cock device on each of said cars operable to admit fluid under pressure to one of said fluid conductors and consequently to one of said piston devices, means responsive to the pressure of fluid supplied to said fluid conductor for admitting fluid under pressure to the fluid conductor and consequently to the piston device on the adjacent car, valve devices for controlling communications from the brake pipes to said brake pipe passages, each one of said valve devices comprising a casing having a piston chamber in communication with the respective fluid conductor and piston device, a valve normally establishing communication from one brake pipe to the respective brake pipe passage, and a piston in said chamber responsive to the pressure of fluid supplied, through said fluid conductor to said piston device, to said chamber for seating said valve to close the communication from the brake pipe to the connected brake pipe passage, whereby the operation of said means is interlocked with the operation of the piston device, the valves of said valve devices being operable to their open positions by fluid under pressure in the brake pipes upon a predetermined reduction in the pressures of fluid in the fluid conductors and the piston chambers of the devices, means for actuating said piston devices to their normal positions upon a predetermined reduction in the pressure of fluid in said fluid conductors, and means for venting fluid under pressure from said conductors at a predetermined slow rate to control the operation of said valve devices and piston devices to their normal positions.

16. The combination with two coupled couplers for the adjacent ends of two cars, said couplers having registering brake pipe passages therethrough and valves operative to close said passages to the faces of said couplers when the couplers are separated, of a brake pipe on each car opening into the brake pipe passage in the respective coupler, locks for said couplers, piston devices operable by fluid under pressure for moving said locks to their release positions, fluid conductors through which fluid under pressure is adapted to be supplied to said piston devices, a normally closed cock device on each of said cars operable to admit fluid under pressure to one of said fluid conductors and consequently to one of said piston devices, means responsive to the pressure of fluid supplied to said fluid conductor for admitting fluid under pressure to the fluid conductor and consequently to the piston device on the adjacent car, valve devices for controlling communications from the brake pipes to said brake pipe passages, each one of said valve devices comprising a casing having a piston chamber in communication with the respective fluid conductor and piston device, a valve normally establishing communication from one brake pipe to the respective brake pipe pasage, and a piston in said chamber responsive to the pressure of fluid supplied, through said fluid conductor to said piston device, to said chamber for seating said valve to close the communication from the brake pipe to the connected brake pipe passage, whereby the operation of said means is interlocked with the operation of the piston device, the valves of said valve devices being operable to their open positions by fluid under pressure in the brake pipes upon a predetermined reduction in the pressures of fluid in the fluid conductors and the piston chambers of the devices, means for actuating said piston devices to their normal positions upon a predetermined reduction in the pressure of fluid in said fluid conductors, and means for reducing the pressure of fluid in said conductors at a predetermined slow rate.

THOMAS H. THOMAS.